United States Patent [19]
Ropiak et al.

[11] Patent Number: 5,896,989
[45] Date of Patent: Apr. 27, 1999

[54] FLEXIBLE MEDICAL CONTAINER PACKAGING

[75] Inventors: Irene K. Ropiak, Lawrenceville; John J. Niedospial, Jr., Burlington; Michelle L. Robinson, East Windsor, all of N.J.

[73] Assignee: Bracco Research USA, Princeton, N.J.

[21] Appl. No.: 09/027,325

[22] Filed: Feb. 20, 1998

[51] Int. Cl.⁶ .................................................. A61B 17/06
[52] U.S. Cl. ........................... 206/438; 604/408; 604/403
[58] Field of Search .................... 604/403, 408, 604/410; 206/438; 383/106

[56] References Cited

U.S. PATENT DOCUMENTS

| | | | |
|---|---|---|---|
| 2,619,277 | 11/1952 | Shumann | 229/55 |
| 4,150,744 | 4/1979 | Fennimore | 206/205 |
| 4,509,197 | 4/1985 | Long | 383/106 |
| 4,548,605 | 10/1985 | Iwamoto et al. | 604/410 |
| 4,660,721 | 4/1987 | Mykleby | 206/439 |
| 4,872,553 | 10/1989 | Suzuki et al. | 206/524.4 |
| 5,086,915 | 2/1992 | Yashima et al. | 206/204 |

*Primary Examiner*—David T. Fidei
*Attorney, Agent, or Firm*—Imre Balogh

[57] ABSTRACT

Flexible medical container containing a light-sensitive medical fluid packaged in an overwrap having UV rays barrier properties to prevent degradation of the light-sensitive fluid but allowing observation of the content of the medical fluid and identifying inscription printed on the medical container.

23 Claims, 3 Drawing Sheets

FLEXIBLE MEDICAL CONTAINER PACKAGING

BACKGROUND OF THE INVENTION

1. Field of the Invention

This invention relates to flexible medical container packaging of aqueous solutions requiring protection form environmental effects of UV lights such as omitted by the sun and fluorescent lights. More particularly, the invention relates to the packaging of fluids such as certain liquid pharmaceutical formulations and diagnostic contrast media sensitive to UV lights in a container which maintains its configuration when filled but flexibly collapses as the fluids are being administered to patients.

2. Reported Developments

Flexible medical containers are known in the art for the containment and delivery of medical fluids. Such containers serve for accommodating blood or for sterile storage of infusion solutions and diagnostic media for parenteral administration. For these purposes the containers must be sterile and sterility is achieved by heating to at least 100° C. or more in an autoclave. Sterility must be maintained during storage and administration of the medical fluids such that environmental conditions such as atmospheric oxidation will not jeopardize the integrity of the medical fluids.

In order to maintain the integrity of the medical fluids both during the sterilization process and storage, the medical bag is packaged in a first packaging material or overwrap having sufficient gas permeability and heat resistance able to withstand heat on autoclaving, and a second packaging material or overwarp which has a high oxygen impermeability. This double packaging results in good shelf life, such as disclosed, for example in U.S. Pat. No. 4,548,605. Other efforts to maintain the integrity of medical fluids during and subsequent to sterilization included the use of multi-layer packaging, such as disclosed in U.S. Pat. No. 4,660,721. Still other efforts included the use of a deoxidizer between the medical fluid-filled container and the outer wrap which outer wrap covers both the container and the deoxidizer.

Certain medical fluids are not only oxygen-sensitive, but also light-sensitive. To prevent TV rays reaching the ophthalmic solution in a vessel, U.S. Pat. No. 4,150,744 discloses the use of a laminate comprising nylon, aluminum foil and polypropylene with which the vessel is overwrapped. Such laminates, containing a metal foil widely used for pouches and bags containing intravenous solutions. However, there is also a need to allow observation of the content of the medical bags during the filling operation and delivery thereof to the patient. To satisfy that need transparent polymeric materials are used. However, such transparent polymeric materials are not sufficient barriers to UV rays.

It would be highly desirable to provide a medical bottle packaged in an overwrap having UV barrier properties yet which would allow observation of the content of the bottle as well as the identifying inscription on the bottle without removing the overwrap.

Such identifying inscription on the medical bottle itself would also reduce errors which may occur during packaging of the medical bottle in an overwrap when the medical bottle and the overwrap are manufactured in different manufacturing operation or at different manufacturing sites.

Applicants have now discovered that, in addition to providing a medical container having the required properties to allow autoclave sterilization, may be packaged in an overwrap which is substantially resistant to UV rays penetration, yet allow viewing the content of the medical bottle and its identifying inscription.

SUMMARY OF THE INVENTION

A flexible, collapsible medical container packaged in an overwrap is provided to prevent degradation of a light-sensitive medical fluid contained in the medical container.

The medical container comprises:

first and second transparent polymeric sheets having a square, round, oval, hexagonal, octagonal or rectangular configuration superimposed and sealed together at their periphery defining an interior reservoir, said container having a top portion and a bottom portion;

an access port located at the bottom center portion sealed between said first and second polymeric sheets removably covered with a cap, said access port is designed for allowing filling of the medical container with a medical fluid and access thereto by a needle or spike access means for delivery of the medical fluid to a patient.

The overwrap comprises:

first and second polymeric sheets having a square, round, oval, hexagonal, octagonal or rectangular configuration superimposed and sealed together at their periphery hermetically sealing said medical container, wherein a substantial portion of said first and said second polymeric sheet is opaque preventing penetration of UV rays into the content of said medical container and wherein the remaining minor portion of said first and said second polymeric sheet is transparent allowing partial viewing of the medical container and its content.

In another embodiment of the present invention the overwrap comprises:

first and second transparent UV rays barrier polymeric sheets having a square, round, oval, hexagonal, octagonal or rectangular configuration superimposed and sealed together at their periphery hermetically sealing said medical container preventing penetration of UV rays into the content of said medical container and allowing viewing of the medical container and its content.

DETAILED DESCRIPTION OF THE INVENTION

Figure 1:
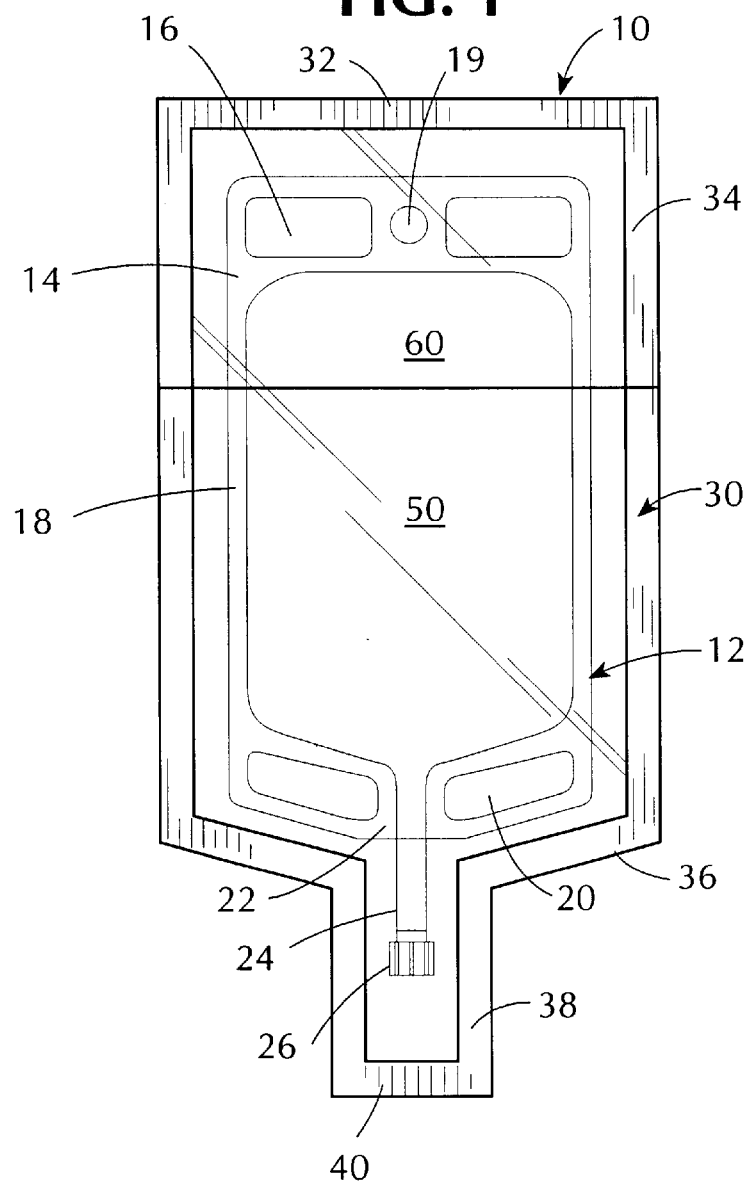
FIG. 1 is a plan view of a medical container and its overwrap package having a bottle shape in accordance with the present invention.
Figure 2:
FIG. 2 is a side elevational view of the medical container and its overwrap package shown in FIG. 1.
Figure 3:
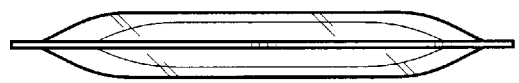
FIG. 3 is a top plan view of the medical container and its overwrap package shown in FIG. 1.
Figure 4:
FIG. 4 is a bottom plan view of the medical container and its overwrap package shown in FIG. 1.
Figure 5:
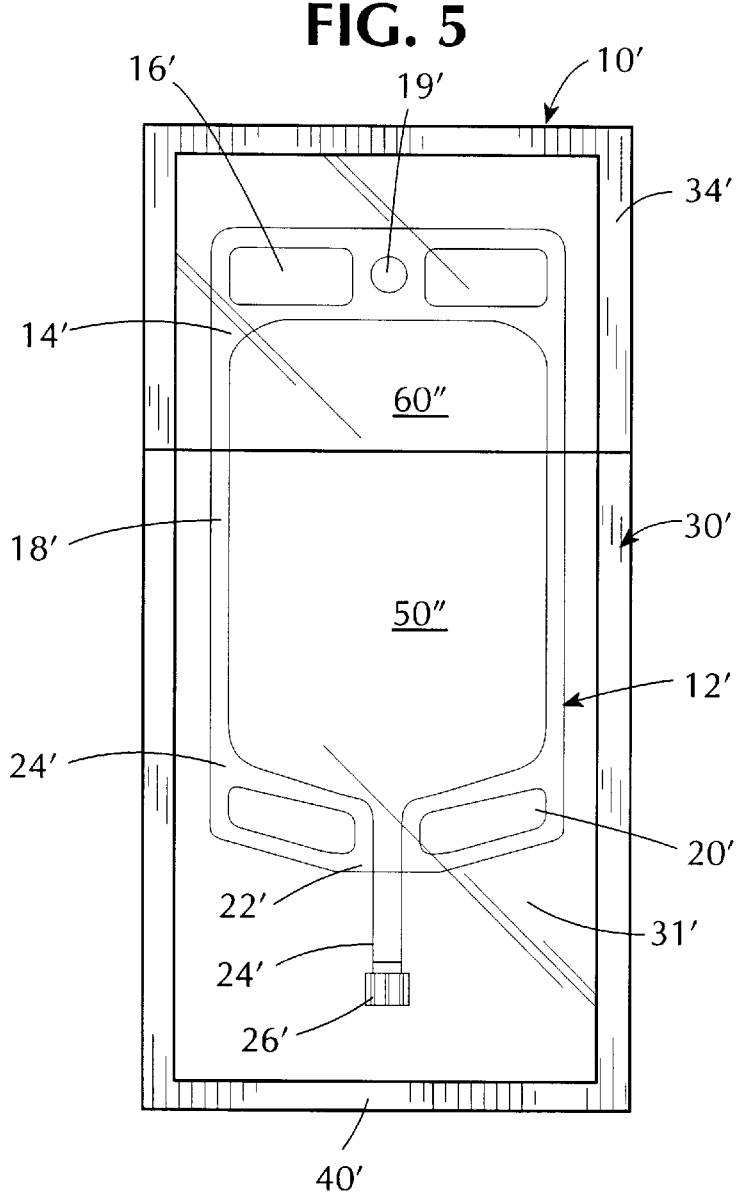
FIG. 5 is a plan view of another embodiment of the present invention showing a medical container and its overwrap package having a rectangular configuration.
Figure 6:
FIG. 6 is a side plan view of the medical container and its rectangular overwrap package shown in FIG. 5.
Figure 7:
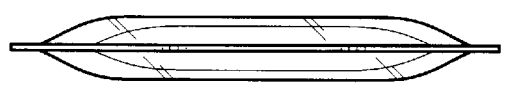
FIG. 7 is a top plan view of the medical container and its rectangular overwrap package shown in FIG. 5.
Figure 8:
FIG. 8 is a bottom plan view of the medical container with its overwrap package shown in FIG. 5.
Figure 9:
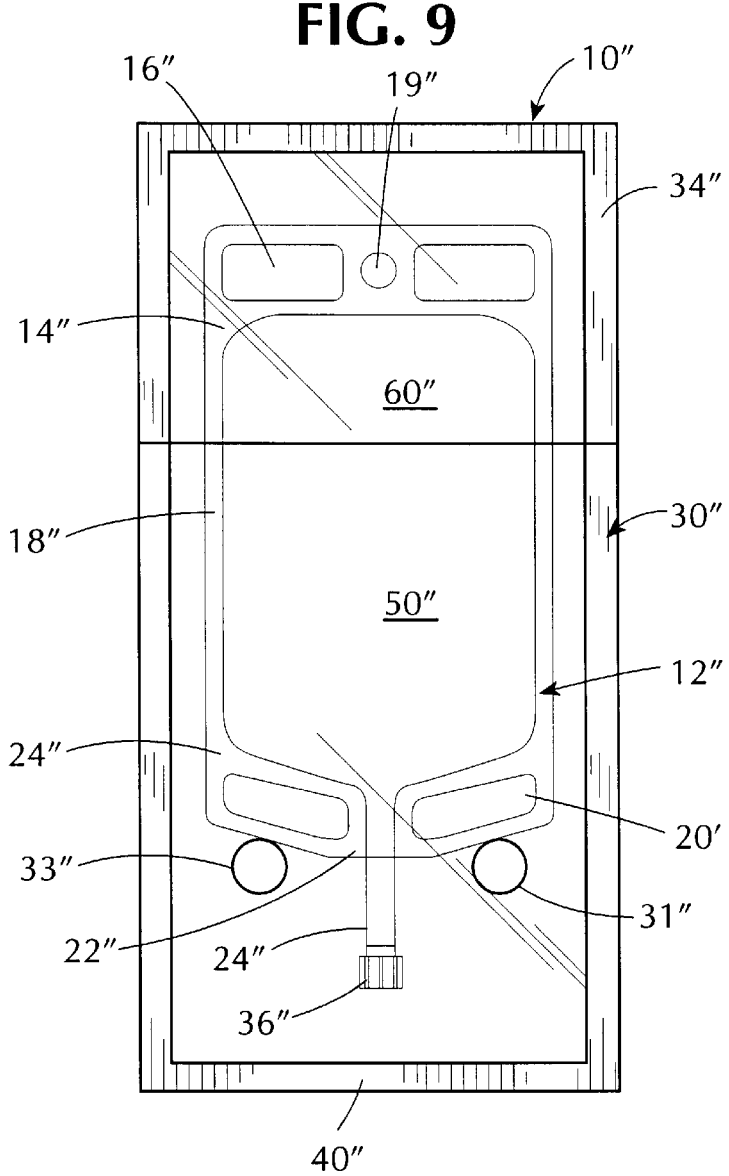
FIG. 9 is a plan view of another embodiment of the present invention showing a medical container and its rectangular overwrap package wherein the medical container is sealed to its overwrap package at least at two point spaced from each other which are to prevent sliding movement of the medical container within its overwrap.
Figure 10:
FIG. 10 is a side plan view of the medical container and its overwrap package shown in FIG. 9.
Figure 11:
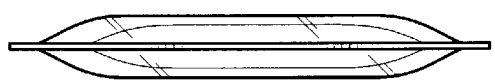
FIG. 11 is a top plan view of the medical container and its overwrap package shown in FIG. 9.
Figure 12:
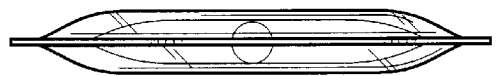
FIG. 12 is a bottom plan view of the medical container and its overwrap package shown in FIG. 9.

The present invention comprising a medical container and its overwrap will be described as having a generally bottle shape or a generally rectangular configuration, however, the shape of the medical container and its overwrap may be of any configuration, such as square, round, oval, hexagonal or octagonal.

Referring to FIGS. 1–4, there is shown a medical container contained in a generally bottle shape overwrap the combination of which is designated by the numeral 10. Medical container 12 is designed for the containment and delivery of diagnostic contrast media, nutrients and drug formulations. The medical container 12 comprises two superimposed sheets of suitable length and width made of flexible or pliable materials, such as polymeric materials including polyethylene, polypropylene, and preferably thermoplastic materials. The superimposed sheets forming the pouch-like container are made of transparent or at least translucent materials so as to allow observation of the amount of its content during the filing operation and delivery thereof to the patient. Each of the superimposed transparent sheets is preferably formed of multilayers of laminated thin films at least one of which constitutes a barrier which is impervious to atmospheric gases, moisture and bacteria. The superimposed sheets are preferably flat welded to each other so as to form the pouch whose volume is zero before it is filled with a parenteral solution. When the medical container is filled or partially filled, it assumes the shape of a cushion. The superimposed sheets are joined together along marginal areas 14, 16, 18, 20 and 22. Access port 24 is located at the bottom portion of the medical container 12 and is sealed between the superimposed sheets. Access port 24 serves for both the filling and the delivery of a parenteral fluid. The access port 24 is closed with a cap 26 to maintain the content of the medical container sealed from the environment.

Medical container 12, as shown in FIG. 1, is enclosed by a bottle shape overwrap package 30. The overwrap package assume the configuration of the medical container 12 including access port 24 and cap 26. The walls of the overwrap package are slightly spaced from the walls of the medical container allowing just enough movement of the medical container within the overwrap package to cushion the medical container from the affects of environmental forces such as experienced on shipping or when the container/overwrap combination is dropped accidentally.

The overwrap package 30 comprises: two superimposed sheets of suitable length and width made of flexible or semi-rigid, transparent, polymeric materials including polyethylene, polypropylene and preferably thermoplastic materials so as to allow observation of the amount of the content of the medical container 12 and also to allow reading of identifying inscription on the medical container, such as the name, volume, manufacturer and lot number of the medical fluid. Each of the superimposed transparent sheets is preferably formed of laminated films at least one of which is impervious to atmospheric gases, moisture and bacteria. The superimposed sheet are joined together along marginal areas 32, 34, 36, 38 and 40.

In order to maintain the integrity of the content of light-sensitive medical fluids in the container the overwrap package 30 further comprises: opaque laminate films having UV barrier properties, such as metal foil, preferably aluminum, heat sealed and covering a substantial portion of the overwrap package 30. As shown in FIG. 1, bottom portion 50, extending toward access port 24, is provided with such an opaque laminate thereby protecting the integrity of light-sensitive medical fluids contained in the medical container.

Top portion 60 of overwrap package 30 is free of the opaque laminate so that the content of the medical container and inscription thereon can be viewed by healthcare professionals. While the transparent portion of the overwrap package is the top 20–30% of the total overwrap area as shown in FIG. 1, the ratio of transparent to opaque area may vary depending on the size of the medical container and the nature and volume of its content. The ratio of transparent to opaque areas are preferably 10:90, more preferably 20:80, and most preferably 30:70. Further, the transparent area may not only be on the top portion of the overwrap package as shown in FIG. 1, but also on any desired area, such as the bottom, side or mid portion of the overwrap package as long as the content of the medical container and certain important identifying inscriptions on the medical container can be viewed by health care personnel.

We have also found that the inside wall of overwrap package treated with silicone dioxide prevents fogging by condensation and thereby provides for better viewing of the medical container through its transparent portion.

Alternatively to the use of laminates having a metal foil layer to block UV rays from reaching the content of the medical container, certain transparent polymeric materials may be used for making the overwrap package 30.

FIGS. 5–8 show another embodiment of the present invention. The medical container and its overwrap are of rectangular configuration. Reference numerals with single superscript (') refer to this embodiment of the invention and the numerals will identify like parts referred to in FIGS. 1–4.

The process of making and the materials of construction are analogous to those described in reference to the embodiment in FIGS. 1–4. The difference being that in this embodiment the overwrap package 30' is of rectangular configuration unlike the bottle shape configuration of the first-described embodiment.

FIGS. 9–12 show still another embodiment of the present invention. The medical container and its overwrap are of rectangular configuration. Reference numerals with double subscript (") refer to this embodiment of the invention and the numerals will identify like parts as referred to in FIGS. 1–4 and 5–8. The distinguishing feature of this embodiment from the embodiment shown in FIGS. 5–8 is that in this embodiment the medical container 12" is sealed to the overwrap 30" at least at two points 31" and 33" spaced from each other. These seal points prevent sliding movement of the medical container 12 in its overwrap 30".

Materials of Construction of the Medical Container

The flexibly collapsible medical containers 12, 12' and 12" of the present invention are made of known polymeric materials having properties which make them suitable for sterile delivery of parenteral liquids. The sheets for forming the walls of the containers are preferably multilayer sheets and characterized by heat resistance, gloss, strength, flexibility, and chemical inertness. The sheets are transparent or at least translucent enabling visual inspection of the contents at all times during delivery of content form the container to the patient. The container must be sterilizable, preferably by heat, along with its content. At least one layer of the sheet must be impervious to atmospheric gases and to steam. Preferably, the internal surface of the containers in contact with the parenteral solution therein should be impervious to gas and steam. The interior layer in contact with the parenteral solution must not contain any toxic agents or even plasticizers which could leach out and contaminate the solution. The sheet may be made, for example, from polyvinylidene chloride sandwiched between two polyethylene or polyvinylacetate layers. The polyvinylidene chloride constitutes the impervious barrier. Further layers may be added to the face or back of the sheet, if desired, such as a polyolefin, preferably, polyethylene. Polyvinyl chloride is also suitable for the construction of the sheet and is well-accepted by the prior art for use in containers for medical fluid collection and delivery. Typical properties of polyvinyl chloride films include: a thickness of about 380 micron; a tensile strength of about 240 kg/cm$^2$; a moisture vapor transmission rate of about 14–20 (g/m$^2$/day at 38° C., 100% RH); and an oxygen barrier of 650 (cc/m$^2$/day at 23° C., 0% RH, bar. CRYOVAC ® V sterlizable medical films (W. R. Grace and Co.) are especially suitable to construct the sheets used in the present invention. The films comprise a polyethylene layer sandwiched between polyester outer layers sealed together by a modified propylene copolymer. Typical properties of the film include: a thickness of about 190 micron; a tensile strength of about 250 kg/cm$^2$; a moisture vapor transmission rate of 5 (g/m$^2$/day at 38° C., 100% RH); and an oxygen barrier of about 1500 (cc/m$^2$/day at 23° C., 0% RH, bar).

Other polymeric films or sheets constructing the flexible container of the present invention include: copolyester ether monolayer films, such as polycyclohexanedimethylcyclohexane, dicarboxylate elastomer made by Eastman Chemical Co.; and ethyl vinyl acetate made by Stedim, Inc. It is important that the fluid contacting layer of the multilayer sheet contain no plasticizer which may contaminate the fluid content of the container. Preferably, no plasticizer should be used at all on any of the multilayers to form the flexible container of the present invention.

Materials of Construction of the Overwrap Package

The overwrap package can be made of the same polymeric materials that the medical container is made of, except in its opaque portion to which, additionally, a UV barrier film is laminated which comprises a metallic foil, such as aluminum foil.

When, as previously indicated, the overwrap package is made of transparent UV rays barrier polymeric material, no UV barrier metallic foil is needed to be laminated to such UV rays barrier polymers.

In this embodiment the overwrap of the present invention at least a portion of which allows viewing the container within the overwrap is preferably made of a clear flexible film having UV absorbing (scavenging) or oxygen absorbing (scavenging) properties so that the content of the container is not affected by these environmental conditions. These polymers include in the form of a film alloys, blends, extrusions, laminations, surface modified and impregnated films or combinations thereof of the following polymeric materials which are capable to withstand autoclave or high-temperature sterilization and which contain UV absorbing or oxygen scavenging agent or into which such agents are incorporated by processes known to those skilled in the art:

copolyester elastomers,
ethylene methacrylate,
ethylene vinyl acetate,
ethylene vinyl alcohol,
low density polyethylene,
nylon/polypropylene,
polyester,
polyolefin,
polypropylene,
polyethylene, and
polyvinylchlioride Blocking agents/UV stabilizers which may be included in the films include:

N-(2-Aminoethyl)-3-aminopropylmethyldimethoxy silane; 3-Aminopropylmethyldiethoxy silane; Amyitrichloroilane Bis (hydroxyethyl) aminopropyltriethoxy silane; Bis-(N-methylbenzanide) ethoxymethyl silane; Bis(trimethylsilyl) acetamide 3-Chloropropyltriethoxysilane
Di-t-butoxydiacetoxysilane
Ethyltriacetoxysilane
(3-Glycidoxypropyl)-methyldiethoxy silane
Isobutyltrimethoxysilane; Isocyanatopropyltriethoxysilane 3-Mercaptopropylmethyldirnethoxysilane; Mercaptopropyltrimethoxysilane;
N-methylaminopropyltrimethoxysilane; Methyltriacetoxysilane; Methyltriethoxysilane; Methyltrirmethoxysilane
Octyltriethoxysilane 2-Phenylethyltrichlorosilane; Phenyltriethoxysilane; n-Propyltrimethoxysilane 3-(N-Styrylmethyl-2-aminoethylamino) propyltrimethoxy silane hydrochloride, 2-(3'-t-butyl-2'-hydroxy-5'-methylphenyl)-5-chlorobenzotriazole, Bis (1,2,2,6,6,-pentamthyl-4-piperidinyl)(3,5-di-t-butyl-4-hydroxybenzyl)butyl propanedioate andethyl 2-cyano-3, 3-diphenylacrylate.

Process of Making The Medical Container

The flexible plastic containers 12, 12' and 12" in the form of a bag, pouch or bottle are made of two rectangular sheets of polymeric materials flat welded together on four sides so as to define between the two sheets and the four welded sides a reservoir. The volume of the container is zero before it is filled and typically has an internal volume capacity of from about 50 to about 5,000 ml when it is filled with a medical fluid, such as a parenteral solution. Access ports 34, 34' and 34" are sealed by the same welding process used to seal the two superimposed layers of sheets together at the bottom center of the container. Upon completion of the welding process the container is suspended via holes 19, 19' or 19", followed by filling the container through the access port with the desired medical fluid. Alternatively, the container may be sealed by heat welding at its four edges except at its center portion and filled with the desired medical fluid prior to sealing the access port between the superimposed sheets. The container with the medical fluid therein is then autoclaved or sterilized by other methods of sterilization known in the art.

Process of Making The Overwrap Package

Subsequent to laminating the film layers together, the overwrap package is made by a heat welding process known in the art.

Having described the invention with reference to its preferred embodiments, it is to be understood that modifications within the scope of the invention will be apparent to those skilled in the art.

What is claimed is:

1. A flexible medical container containing a light-sensitive medical fluid therein packaged in an overwrap to prevent degradation of said light-sensitive medical fluid wherein:
   (a) said medical container comprises:
      first and second transparent polymeric sheets superimposed and sealed together at their periphery defining an interior reservoir, said container having an inside wall an outside wall, a top portion and a bottom portion;
      an access port located at the bottom center portion sealed between said first and second polymeric sheets removably covered with a cap, said access port is designed for allowing filling of the medical container with a medical fluid and access thereto by a needle or spike access for delivery of the medical fluid to a patient;
   (b) said overwrap comprises:
      first and second polymeric sheets having an inside wall and an outside wall superimposed and sealed together at their periphery hermetically sealing said medical container, wherein of from about 70% to about 90% of said first or said second polymeric sheet is opaque preventing penetration of UV rays into the content of said medical container and wherein of from about 10% to about 30% of said first or said second polymeric sheet is transparent.

2. The flexible medical container, packaged in an overwrap, of claim 1 wherein said first and second polymeric sheets are made of polyvinylidene chloride sandwiched between two layers of polyethylene or polyvinylacetate.

3. The flexible medical container, packaged in an overwrap, of claim 1 wherein said first and second polymeric sheets are made of polyvinyl chloride.

4. The flexible medical container, packaged in an overwrap, of claim 1 wherein said first and second polymeric sheets are made of a polyethylene layer sandwiched between polyester outer layers sealed together by a propylene copolymer.

5. The flexible medical container, packaged in an overwrap, of claim 1 wherein said first and second polymeric sheets are made of polycyclohexanedimethylcyclohexane dicarboxylate.

6. The flexible medical container, packaged in an overwrap, of claim 1 wherein said first and second polymeric sheets are made of ethyl vinyl acetate.

7. The flexible medical container, packaged in an overwrap, of claim 1 wherein said first and second polymeric sheets constituting said opaque portion of said overwrap are made of a laminate comprising polyethylene, polyvinylidene chloride, aluminum foil and polyvinylacetate.

8. The flexible medical container, packaged in an overwrap, of claim 1 wherein said first and second polymeric sheets constituting said opaque portion of said overwrap are made of a laminate comprising polyvinyl chloride and aluminum foil.

9. The flexible medical container, packaged in an overwrap, of claim 1 wherein said first and second polymeric sheets constituting said opaque portion of said overwrap are made of a laminate comprising polyester, polypropylene and aluminum foil.

10. The flexible medical container, packaged in an overwrap, of claim 1 wherein said first and second polymeric sheets constituting said opaque portion of said overwrap are made of a laminate comprising polycyclohexanedimethylcyclohexane dicarboxylate and aluminum foil.

11. The flexible medical container, packaged in an overwrap, of claim 1 wherein said first and second polymeric sheets constituting said opaque portion of said overwrap are made of a laminate comprising ethyl vinyl acetate and aluminum foil.

12. The flexible medical container, packaged in an overwrap, of claim 1 wherein the inside wall of said overwrap is treated with silicone dioxide to prevent fogging by condensation.

13. The flexible medical container packaged in an overwrap of claim 1 wherein the inside walls of said overwrap are spaced from the outside walls of said medical container to allow for slight cushioning movement of said medical container within said overwrap.

14. The flexible medical container packaged in an overwrap of claim 1 wherein said medical container is sealed to said overwrap at least at two contact points to prevent excessive sliding movement of said medical container in said overwrap.

15. A flexible medical container containing a light-sensitive medical fluid therein packaged in an overwrap to prevent degradation of said light-sensitive medical fluid wherein:
   (a) said medical container comprises:
      first and second transparent polymeric sheets superimposed and sealed together at their periphery defining an interior reservoir, said container having an inside wall, an outside wall, a top portion and a bottom portion;
      an access port located at the bottom center portion sealed between said first and second polymeric sheets removably covered with a cap, said access port is designed for allowing filling of the medical container with a medical fluid and access thereto by a needle or spike access for delivery of the medical fluid to a patient;
   (b) said overwrap comprises:
      first and second transparent UV rays barrier polymeric sheets having an inside wall and an outside wall superimposed and sealed together at their periphery hermetically sealing said medical container preventing penetration of UV rays into the content of said medical container.

16. The flexible medical container packaged in an overwrap of claim 15 wherein said overwrap is made of a transparent, UV rays absorbent material selected from the group consisting of: copolyester elastomers, ethylene methacrylate, ethylene vinyl acetate, ethylene vinyl alcohol, low density polyethylene, nylon/polypropylene, polyester, polyolefin, polypropylene, polyethylene and polyvinylchloride, containing a U blocking or UV absorbing agent.

17. The flexible medical container, packaged in an overwrap, of claim 15 wherein said first and second polymeric sheets are made of polyvinylidene chloride sandwiched between two layers of polyethylene or polyvinylacetate.

18. The flexible medical container, packaged in an overwrap, of claim 15 wherein said first and second polymeric sheets are made of polyvinyl chloride.

19. The flexible medical container, packaged in an overwrap, of claim 15 wherein said first and second polymeric sheets are made of a polyethylene layer sandwiched between polyester outer layers sealed together by a propylene copolymer.

20. The flexible medical container, packaged in an overwrap, of claim 15 wherein said first and second polymeric sheets are made of polycyclohexanedimethylcyclohexane dicarboxylate.

21. The flexible medical container, packaged in an overwrap, of claim 15 wherein said first and second polymeric sheets are made of ethyl vinyl acetate.

22. The flexible medical container of claim 1 wherein: said first and second polymeric sheets superimposed and sealed together at their periphery form an interior reservoir having a configuration selected from the group consisting of square, round, oval, hexagonal, octagonal and rectangular; and said first and second polymeric sheets superimposed and sealed together at their periphery hermetically sealing said medical container having a configuration selected from the group consisting of square, round, oval, hexagonal, octagonal and rectangular.

23. The flexible medical container of claim 15 wherein: said first and second polymeric sheets superimposed and sealed together at their periphery form an interior reservoir having a configuration selected from the group consisting of square, round, oval, hexagonal, octagonal and rectangular; and said first and second polymeric sheets superimposed and sealed together at their periphery hermetically sealing said medical container having a configuration selected from the group consisting of square, round, oval, hexagonal, octagonal and rectangular.

* * * * *